(12) United States Patent
Kalb

(10) Patent No.: US 9,668,511 B2
(45) Date of Patent: Jun. 6, 2017

(54) PORTIONING AND STORING FOODS

(76) Inventor: John R. Kalb, St. Augustine, FL (US)

( * ) Notice: Subject to any disclaimer, the term of this patent is extended or adjusted under 35 U.S.C. 154(b) by 0 days.

(21) Appl. No.: 13/507,311

(22) Filed: Jun. 20, 2012

(65) Prior Publication Data

US 2017/0042200 A1 Feb. 16, 2017

Related U.S. Application Data

(60) Provisional application No. 61/571,022, filed on Jun. 20, 2011.

(51) Int. Cl.
| | | |
|---|---|---|
| *A23L 3/36* | (2006.01) |
| *A23L 13/60* | (2016.01) |
| *A23L 13/50* | (2016.01) |
| *A23B 4/06* | (2006.01) |
| *B65B 61/24* | (2006.01) |
| *B65D 85/72* | (2006.01) |
| *B65B 7/02* | (2006.01) |
| *B65B 63/08* | (2006.01) |

(52) U.S. Cl.
CPC ............. *A23L 3/364* (2013.01); *A23B 4/068* (2013.01); *A23L 13/55* (2016.08); *A23L 13/60* (2016.08); *B65B 7/02* (2013.01); *B65B 61/24* (2013.01); *B65B 63/08* (2013.01); *B65D 85/72* (2013.01); *A23V 2002/00* (2013.01)

(58) Field of Classification Search
CPC .......... A23B 4/068; A23L 3/364; B65B 61/24
See application file for complete search history.

(56) References Cited

U.S. PATENT DOCUMENTS

| | | | | |
|---|---|---|---|---|
| 1,020,004 A | * | 3/1912 | Wishman | A47J 37/0611 |
| | | | | 220/526 |
| 1,663,719 A | * | 3/1928 | Morley | A21C 11/002 |
| | | | | 249/121 |
| 2,762,319 A | * | 9/1956 | Simmons | A01J 21/00 |
| | | | | 249/164 |
| 3,696,734 A | * | 10/1972 | Beasley | A47J 37/0611 |
| | | | | 219/525 |
| D643,243 S | * | 8/2011 | Harrod | D7/352 |

* cited by examiner

*Primary Examiner* — James Sanders
(74) *Attorney, Agent, or Firm* — Mark Young, P.A.

(57) ABSTRACT

A mass of divisible food in a sealed bag is placed between a first part of a frame having a plurality of walls depending from a common plane and forming a plurality of cavities and a second part of the frame having cavities that correspond with and confront the cavities of the first part. The second part is forced toward the first part to pressurize the divisible food in the bag and force the bag to occupy the cavities. Then, the frame, bag and contents are placed in a freezer.

7 Claims, 2 Drawing Sheets

PORTIONING AND STORING FOODS

RELATED APPLICATION

This application is a continuation of Provisional Application No. 61/571,022 filed Jun. 20, 2012.

BACKGROUND OF INVENTION

The present invention relates to methods and apparatus for dividing a divisible mass of food into portions that are suitable for consumption by one or two people at a single meal and to methods and devices for storing a mass of divisible food in portion sizes. The term "divisible mass of food," as used herein, means a mass or body of food that can be divided into portions without cutting or breaking the mass into smaller parts, thus excluding large solids and including masses of small pieces of food such as chicken breasts or legs, granular food such as small fruits and vegetables, ground food such as ground meats, fish and fruit and liquid food such as soups or sauces.

While the eating habits of the general population vary greatly, there is general agreement that food should be served in the quantity that a person prefers or requires, that quantity being referred to herein as a "portion." For example, a light eater may require four ounce portions of meat, potatoes and vegetable and a heavy eater may require six or eight ounce portions of meat, potatoes and vegetables. The present invention will divide a mass into a plurality of approximately equal portions, the size of the portions being determined by the size if the divisible food mass to be divided and the number if portion being determined by the construction of the equipment.

In some situations food may be purchased in portion sizes, but generally at a higher price than in a larger quantity. Food is generally obtained in quantities greater than the size of a portion, and the person who prepares the food divides the quantity of obtained food to produce a portion that approximates the correct quantity. This practice requires the preparer of the food to reduce the size of a mass of the particular food to portion size each time that food is to be prepared for a meal, thus adding a burden to meal preparation. Further, the process produces an excess quantity of food, and unless there is an immediate use for the excess, the preparer must either wrap and store the excess or dispose of the excess, thus adding another burden onto the food preparer.

The food industry has provided food in portion sizes packaged for consumption by a limited number of people for many years. U.S. Pat. No. 2,917,388 to Sullivan et al. describes a process for producing meat products in portion sizes by grinding the meat into granules, thereafter forming a slab of ground meat, thereafter freezing the slab and then cutting slices from the slab in portion sizes. The slices are thereafter shaped, frozen and preserved as frozen products. Even though the individual consumer usually obtains ground meat in ground state, this process would be time consuming and difficult for the individual consumer to carry out because commercial equipment to cut the frozen slab is not available and packaging for storing would be burdensome and time consuming. Hence, there is a need for an improved method to apportion quantities of food into portion sizes and for apparatus for carrying out such a method. Further, this need extends to the individual consumer and must be satisfied by the equipment generally available in the kitchens of individual consumers.

SUMMARY OF INVENTION

It is a general object of the present invention to provide a method for dividing a quantity or mass of divisible food into portions that is suitable for use by an individual or a small group of consumers and apparatus for carrying out the method.

It is a further object of the invention to provide a method for dividing a mass of divisible food into portions that requires less labor than such methods heretofore required and apparatus for carrying out the method.

The inventor has found that it is preferable for the individual consumer to divide a mass of divisible food into portions and thereafter freeze the portions to maintain the size and shape of the portions and preserve the portions rather than the commercial process of forming a slab of divisible food, thereafter freezing the slab, thereafter slicing the slab into portions, and thereafter refreezing the slices. By dividing the divisible mass of food prior to freezing, the inventor avoids the need for cutting portions from a frozen slab and equipment capable of slicing a frozen slab which is generally not available in consumer's kitchens.

Further, the inventor has found that the step of dividing the divisible mass of food may be greatly facilitated by use of a frame with multiple cavities that depend from a common plane and are separated from each other by walls. The cavities are disposed adjacent to each other and preferably clustered about a center. With the common plane disposed horizontally and the cavities depending from the common plane, the mass of divisible food is positioned on the common plane centrally between the cavities and manually forced into the cavities with the aid of gravity, thereby dividing the mass into approximately equal parts.

In the preferred embodiment described hereinafter, the frame has two substantially identical parts hinged together at one side to form a clam-shell press, each part having a plurality of adjacent cavities that confront an equal number of adjacent cavities on the other part. The one part of the frame is rotatable with respect to the other part between a closed position in which each cavity of the one part confronts a cavity of the other part to an open position in which the two parts are disposed at an angle to each other and the cavities of one part are separated from the cavities of the other part. The two part frame is used to divide a mass of divisible food into substantially equal portions by rotating the parts of the frame to open position, placing the mass centrally on one part of the frame, rotating the two parts of the frame towards closed position so that the mass is squeezed between the two parts of the frame and the mass flows into the pairs of confronting cavities. The two parts of the frame are forced to a substantially closed position, thus forming a portion in each pair of confronting cavities. Thereafter the individual portions are placed in the freezer and frozen for storage. The individual portions may be manually removed from the cavities before freezing or the frame with the portions still disposed in the cavities may be placed in the freezer as a unit. As described above, the use of a frame can be effective to divide a mass of divisible food into portions, but it is also labor intensive. If the portions are removed from the frame prior to freezing, each portion must be individually handled and the frame will be left with food remnants thereon and must be laboriously cleaned. If the portions are frozen in the frame, it will be difficult to retrieve a single portion for use, and the frame will also ultimately be left requiring cleaning.

The inventor has significantly reduced the labor required to produce multiple portions of food from a divisible mass and also reduce the differences in the size of the portions produced by the process by modifying the frame and incorporating an additional piece of equipment in the process. The additional piece of equipment is a freezer bag constructed of air impermeable plastic material with an opening to permit insertion of food items and a releasable sealing means to close and seal the opening so that the interior of the bag is sealed from the ambient atmosphere. The bag is constructed of flexible plastic material that resists bonding with the food contents of the bag and may be stretched to release items of food frozen within the bag from the surface of the bag. The bag may be used with the frame and process described above by inserting the divisible food mass into the bag before applying it to the frame for division into portions. The bag with the mass of divisible food sealed from the atmosphere inside the bag is then placed on one part of an open frame and the frame forced into a substantially closed position to divide the mass into portions in the pairs of cavities of the frame. Thereafter, the two parts of the frame are locked in position, either by tape disposed across the side opposite the hinge or a mechanical latch between the two parts of the frame. Thereafter, the locked frame with bag and contents are placed into the freezer.

A freezer bag tends to add resistance to distributing the food into the cavities of a frame, tends to produce greater deviations in the size of the portions produced by the process than if no freezer bag is used, and requires restraints to prevent the frame and bag with contents becoming disengaged. The inventor has overcome these drawbacks to using a freezer bag with the novel two part frame described above and in the preferred embodiment hereafter.

The two piece frame is designed to divide divisible food masses while disposed in a bag and to retain them in the bag while being frozen—not to function as a food press. In the closed position of the frame, the two parts of the frame confront each other, but are spaced from each other by a gap barely sufficient to permit the bag to extend from the interior to the exterior of the frame. The gap is defined by the distance between the common plane of one part of the frame from the common plane of the other part when the frame is substantially closed and the two common planes are parallel to each other. Mechanically this position can be achieved by mounting the parts of the frame with parallel common planes on a C-clamp, one part of the frame being mounted on the stationary end of the C and the other part on the translatable end of the C. The inventor's preferred construction uses a clam-shell construction with one or more hinges mounted between confronting sides of the two parts of the frame.

Once the mass of divisible food has been divided into portions by closing the two parts of the frame on the bag containing the food mass, it becomes necessary to retain the frame in the closed position to prevent redistribution of the food mass and to minimize the freezer space required for the frame and its contents. The two parts of the frame may be latched together using any of the common latch structures. In the preferred construction, a latch is formed by an L-shaped strip mounted on one part of the frame and extending outwardly therefrom generally parallel to the common plane of said part of the frame to a bend. On the opposite side of the bend the strip extends normal to the common plane and has a protruding tooth extending from adjacent the end thereof. With the frame near the closed position, the strip is insertable in a slot in a plate mounted on the other part of the frame. This construction has the advantage that in the closed position of the frame it will retain the two parts of the frame in abutting relationship and it will also hold the frame closed when the bag with contents is disposed between the two parts of the frame.

The gap between the two parts of the frame also functions to produce a web between portions of the apportioned food mass that is removed from the bag after freezing and storage. This web is formed by food from the mass of food remaining in the gap when the parts of the frame are closed. The web functions to retain the portions interconnected to permit handling as a single piece. Accordingly, the apportioned mass is removable from the bag after freezing as a single piece, and one or more portions may be broken from the single piece as desired by the application of force between adjacent portions.

The inventor has found that it is preferable for the frame to fully enclose the bag when it is disposed in the closed frame. Before the contents of the bag are frozen, a bag fully enclosed in the frame will be less susceptible to redistribution of the contents of the bag, and after freezing the shape of the frame and bag with contents will remain in a shape for efficient use of refrigerator space. Accordingly, each of the cavities in both parts of the frame is open at the top and provided with walls and a bottom. When closing the frame on an air impermeable bag containing a mass of divisible food, the bag will be forced into engagement with the walls and bottom of each cavity, thus tending to trap air in restricted volumes between the bag and the frame. Entrapped air between the bag and frame may result in unequal distribution of the mass in the cavities or other distortion of the distribution. Accordingly, the inventor has provided air vents between the bag and the ambient atmosphere in the form of perforations in the bottoms of the cavities.

Other advantages, benefits and features of the invention will be apparent to those skilled in the art upon reading the detailed description of the invention and studying the drawings.

DETAILED DESCRIPTION OF THE INVENTION

While the present invention may be practiced with any divisible food, the inventor has found most frequent use with ground or diced meat, a plurality of chicken parts and soups. Accordingly, the process and apparatus will be described as used with ground meat.

Figure 1:
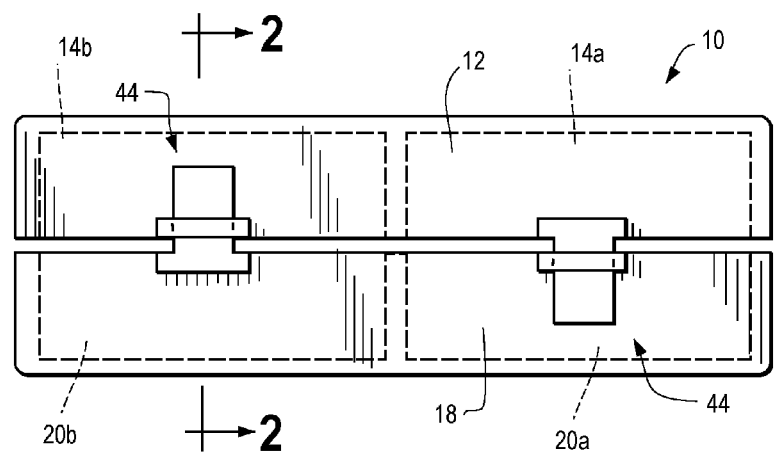
FIG. 1 is a side elevational view of a frame in the closed position suitable for practicing the present invention.

Two pound packages of ground beef can often be purchased from retail stores at unit cost substantially lower than if purchase in one pound packages. Two pounds of ground beef is about four times larger than generally used by a one or two person household for a single meal, so the inventor has provided a frame with four pairs of cavities to produce four portions from two pounds of ground beef. The frame is illustrated at 10 in FIGS. 1-3, and has an upper part 12 with four cavities 14a, 14b, 14c and 14d extending from a first plane 16. The frame also has a lower part 18 with four cavities 20a, 20b, 20c and 20d depending from a second plane 22. The cavities are arranged in confronting pairs, cavity 14a confronting cavity 20a, 14b confronting 20b, 14c confronting 20c and 14d confronting 20d. The combined cavities of each pair provide sufficient volume for a single portion of divisible food. In the preferred embodiment, the cavities in the upper and lower parts of the frame are each square measuring 4.75 inch by 4.75 inch by 0.75 inch, thus each pair of cavities contains about 34 cubic inches of volume for producing one single portion of food.

Figure 2:
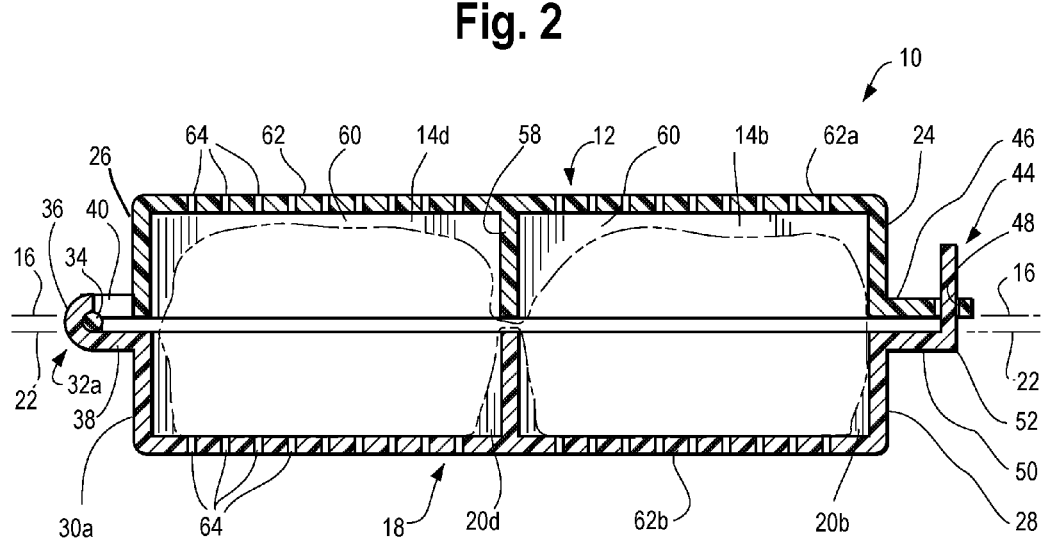
FIG. 2 is a sectional view of the frame taken along line 2-2 of FIG. 1.
Figure 3:
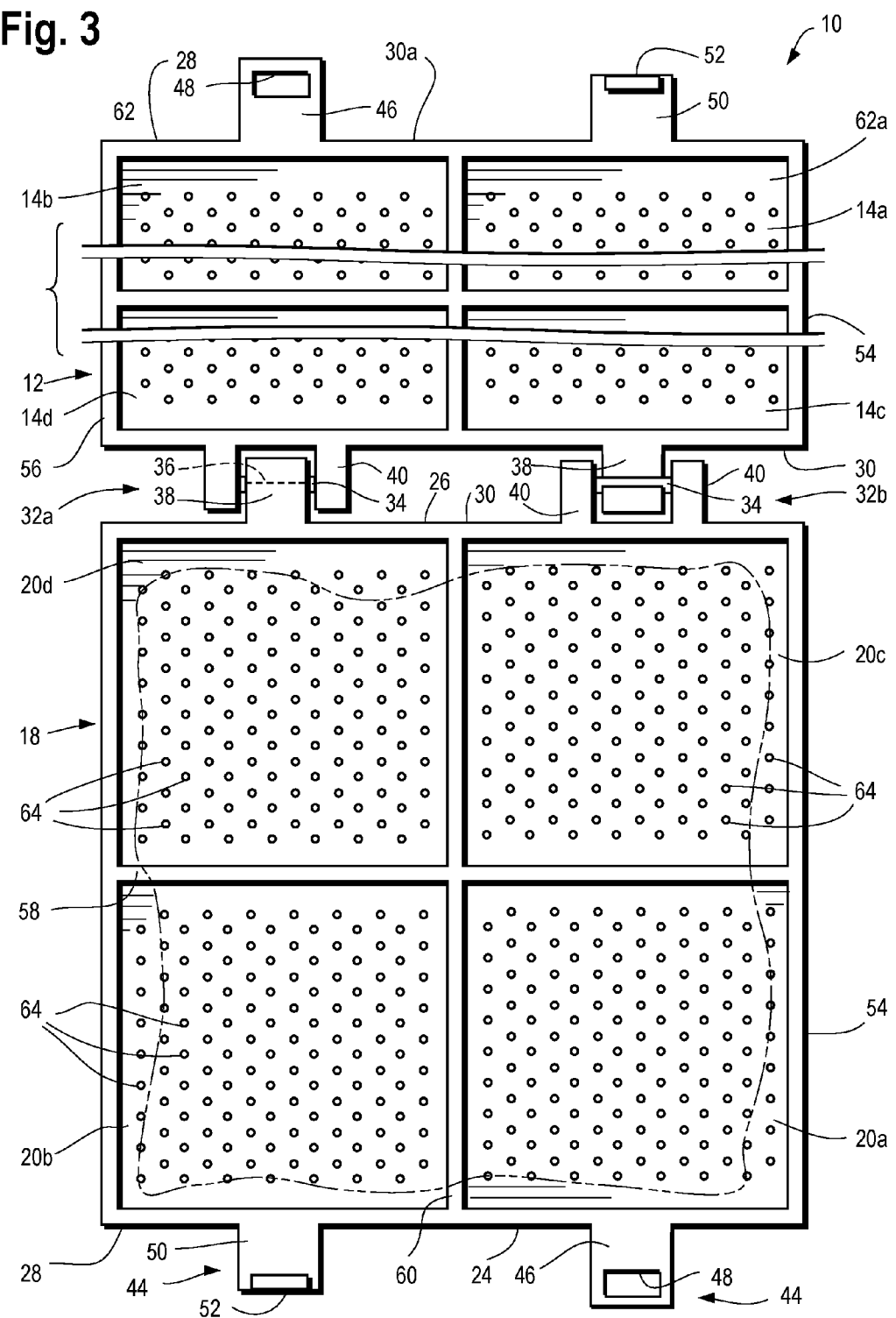
FIG. 3 is a plan view of the frame of FIGS. 1 and 2 in fully open position.

As best illustrated in FIG. 2, the upper part 12 of the frame 10 has a front wall 24 and a back wall 26. In like manner, the lower part 18 of the frame 10 has a front wall 28 and a back wall 30, and when the frame is in the closed position, as illustrated in FIG. 2, the front wall 24 of the upper part of the frame and 28 of the lower part are disposed in the same plane. In like manner, the back wall 26 of the upper part 12 and the back wall 30 of the lower part 18 are disposed on a common plane. As illustrated in FIG. 3, the back walls 26 and 30 are attached to each other by a pair of hinges 32a and 32b to form a clam-shell device.

The hinge 32a is formed by a pin 34 which is mounted within a sleeve 36. The sleeve 36 is disposed at the end of an arm 38 which is mounted at its opposite end on the back wall 30 of the lower part 18. The pin 34 is mounted at opposite ends on a pair of parallel posts 40 which extend to the back wall 26 of the upper part 18 of the frame 10. The hinge 32b is constructed identically to hinge 32a and is illustrated bearing the same reference numerals. The hinge 32b is mounted between the back wall 26 of the upper part 12 of the form 10 and the back wall 30 of the lower part 18 of the frame 10 with its pin 34 on a common axis with the pin 34 of hinge 32a.

The hinge 32a has an arm 38 and posts 40 disposed on radii of the pin 34 and at an acute angle to the plane 22; and hinge 32b has an arm 38 and posts 40 disposed on radii of the pin 34 at the same angle. Also, the lengths of the arms and posts positions the planes 16 and 22 parallel to each other when the frame is adjacent to the closed position. As a result, with the frame in the position that the planes 16 and 22 are parallel to each other, as is the position of the upper and lower parts of the frame when the frame contains a freeze bag with contents, there will be a small gap 42 of about 1/32 to 1/16 inch between the upper and lower parts of the frame 10.

As shown in FIGS. 2 and 3, a pair of spaced latches 44a and 44b is mounted in spaced relation between the upper part 12 and the lower parts 18 of the frame 10, respectively. One of the latches 44a has a plate 46 that extends outwardly from the wall 24 and the upper part 12 of the frame, and the plate 46 has an aperture 48 that extends through the plate and is spaced from the wall 24. The latch 44a also has L-shaped strip 50 that is mounted at one end on the wall 28 of the lower part 18 and extends outwardly therefrom to a bend 52 on an axis generally parallel with the wall 24 and extending through the opening 48 in the plate 46, the strip 50 following the axis through the opening 48 from the bend 52. A protuberance extends outwardly from the L-shaped strip on the side of the opening opposite the lower part 18 of the frame 10 to latch the frame in closed position. By latching the upper and lower parts of the frame through the plate 46 and L-shaped strip 50 a flexible latch is provided which will allow for materials being wedged between the upper and lower parts of the frame 10. The other latch 32b is of identical construction to latch 32a, except that the plate 46 is mounted on front wall 28 of the lower part 18 of the frame 10 and the L-shaped strip 50 is mounted on the front wall 24 of the upper part 12 of the frame 10. Latch 32b is illustrated with the same reference numbers as latch 32a.

As best illustrated in FIG. 3, the upper part 12 and lower part 18 of the frame 10 each have opposed side walls 54 and 56. Both the upper part 12 and lower part 18 are provided with a divider wall 58 that extends between the center of sidewall 54 and the center of sidewall 56. The shape and dimensions of the cavities 14 and 20 in the upper part 12 and lower part 18 of the frame 10 are completed by partitioning wall 60 which extends between the centers of side wall 54 and 56. Like the front walls 24 and 28 and back walls 26 and 30, side walls 54 and 56, divider walls 58 and partition walls 60 depend from planes 16 or 22, thus forming flat a pair of matching flat grids for dividing masses of divisible food positioned between the upper part 12 and lower part 18 of the frame 10.

Each of the four cavities 14a, 14b, 14c and 14d of the upper part 12 of the frame 10 is provided with a bottom 62a disposed parallel to the plane 16 and extending from the side of the walls that form that cavity opposite the plane 16. In like manner, each of the four cavities 20a, 20b, 20c and 20d of the lower part 18 of the frame 10 is provided with a bottom 62b disposed parallel to the plane 16 and extending from the side of the walls that form that cavity opposite the plane 16. Each of the bottoms 62a and 62b is provided with a plurality of perforations 64 distributed there over to provide venting to prevent air pockets from developing between the frame and air impermeable bag during the period when the open frame 10 is being closed on the bag and its contents.

In the preferred embodiment of the present invention, the frame is constructed of polyethylene plastic using a molding process and the walls and bottoms are all about 0.2 centimeters in thickness. Other plastics such as polyurethane or polystyrene may be used, and metals such as aluminum or stainless steel are suitable for the frame.

The preferred embodiment of the frame 10 is specifically designed to divide masses of divisible food into portions and has the capacity to divide thirty-two ounces of ground meat into four portions of eight ounces each. The mass of ground meat is first removed from all packaging or wrapping and placed in a one gallon freezer bag that is constructed of air impermeable resilient plastic and has a sealable opening for receiving and retrieving work products. Thereafter, excess air is removed from the bag by applying pressure on the outside of the bag and the bag is sealed from the ambient atmosphere using the sealing means provided with the bag.

The frame 10 is placed on a generally horizontal surface and opened to assume the position of FIG. 3, and thereafter the bag and its contents is placed centrally on the lower part 18 of the frame 10. At this time the process may benefit from smoothing the bag over the four cavities of the lower part 18 of the frame. The frame is then closed by rotating the upper part 12 on the hinges 32a and 32b until the upper part 18 engages the bag with its contents. Downward pressure is then applied to the upper part 18 of the frame to force the contents of the bag to flow into the four pairs of cavities, thus dividing the contents of the bag into four portions. The downward pressure also rotates the upper part of the frame toward the closed position, and when the closed position is reached the latches 44a and 44b activate securing the frame for storage. The frame is then placed in a freezer with a temperature below the freezing temperature, and maintained under freezing conditions for a time sufficient to freeze the ground meat. The bag may then be removed from the frame 10 by releasing the latches 44a and 44b and the frozen apportioned mass of ground meat may be removed from the bag to retrieve one or more portions for food preparation or left in the bag for continued storage in the freezer.

The frozen contents of the bag may be removed from the bag in frozen condition (without first thawing the ground meat) because the freezer bag may resist becoming attached to its contents during the freezing process or by stretching the bag to permit the bag's elasticity to release the frozen contents of the bag.

Those skilled in the art will recognize additional advantages and benefits of the present invention from the foregoing description and develop modifications and products within the scope of the present invention. It is therefore intended that the invention be not limited by the forgoing disclosure, but only by the appended claims.

The invention claimed is:

1. A frame for dividing a mass of divisible food into portions comprising a first part having a first wall extending about the perimeter of the first part and extending from a first common plane, said first part also having a first divider wall extending from the common plane and disposed within and extending from the first perimeter wall forming a first plurality of cavities between the first perimeter wall and the first divider wall of approximate equal areas, said frame having a second part with a second wall extending about the perimeter of the second part and extending from a second common plane, said second part having a second divider wall extending from the second common plane and disposed within and extending from the second perimeter wall forming a second plurality of cavities between the second perimeter wall and the second divider wall of areas approximately equal to the areas of the cavities in the first part of the frame, a hinge mounted between the first perimeter wall of the first part of the frame and the second perimeter wall of the second part of the frame, said hinge being rotatable between a closed position of the frame, in the closed position of the frame the first common plane of the first part and the second common plane of the second part are substantially parallel and each cavity of the first group of cavities of the first part confronts a cavity of the second group of cavities of the second part of the frame, the confronting cavities forming pairs of communicating cavities, in the open position of the hinge the first and second common planes of the frame are disposed at an angle and the cavities are exposed for receiving a mass of divisible food for apportionment, wherein each of the cavities of the first part of the frame is provided with a bottom wall disposed on the side of the first perimeter wall opposite the first common plane, and each of the cavities of the second part of the frame is provided with a bottom wall disposed on the side of the second perimeter wall opposite the second common plane, each of the bottom walls is provided with a plurality of perforations to vent air pockets developed by use of the frame to the ambient atmosphere.

2. The frame for dividing a mass of divisible food into portions according to claim 1, further comprising a latch, said latch having an L-shaped strip mounted at one end on the side of the first perimeter wall of the first part of the frame approximately opposite to the hinge, said strip extending outwardly from the first part of the frame to a bend, and perpendicularly to the first common plane from the bend, said strip having an outwardly protruding tooth disposed adjacent to the end thereof opposite the bend, said latch having a plate with an edge mounted on the side of the second perimeter wall of the second part of the frame approximately opposite to the hinge, said plate having an aperture therein adapted to slidably accommodate the strip, the strip being disposed within the opening in the plate with the tooth on the opposite side of the plate from the first part of the frame and engaging the plate, whereby the latch will retain the frame in closed position even though the frame is not completely closed.

3. The frame for dividing a mass of divisible food into portions, according to claim 1, wherein the first perimeter wall of the frame is square in a plane parallel to the first common plane and the second perimeter wall of the frame is square in a plane parallel to the second common plane, the first part of said frame having two divider walls extending between opposite sides of the first part of the frame perpendicular to each other, said divider walls providing the first part of the frame with four square cavities, the second perimeter wall of the frame is square in a plane parallel to the second common plane, the second part of said frame having two divider walls extending between opposite sides of the second part of the frame perpendicular to each other, said divider walls providing the second part of the frame with four square cavities.

4. A frame system for dividing a mass of divisible food into portions comprising:
   a first part having a first wall extending about the perimeter of the first part and extending from a first common plane, said first part also having a first divider wall extending from the common plane and disposed within and extending from the first perimeter wall forming a first plurality of cavities between the first perimeter wall and the first divider wall of approximate equal areas; and
   a second part with a second wall extending about the perimeter of the second part and extending from a second common plane, said second part having a second divider wall extending from the second common plane and disposed within and extending from the second perimeter wall forming a second plurality of cavities between the second perimeter wall and the second divider wall of areas approximately equal to the areas of the cavities in the first part of the frame; and
   a hinge mounted between the first perimeter wall of the first part of the frame and the second perimeter wall of the second part of the frame, said hinge being rotatable between a closed position of the frame, in the closed position of the frame the first common plane of the first part and the second common plane of the second part are substantially parallel and each cavity of the first group of cavities of the first part confronts a cavity of the second group of cavities of the second part of the frame, the confronting cavities forming pairs of communicating cavities, in the open position of the hinge the first and second common planes of the frame are disposed at an angle and the cavities are exposed for receiving a mass of divisible food for apportionment; and
   wherein each of the cavities of the first part of the frame is provided with a bottom wall disposed on the side of the first perimeter wall opposite the first common plane, and each of the cavities of the second part of the frame is provided with a bottom wall disposed on the side of the second perimeter wall opposite the second common plane, each of the bottom walls is provided with a plurality of perforations to vent air pockets developed by use of the frame to the ambient atmosphere; and
   an air tight bag containing a mass of divisible food disposed between the first part of the frame and the second part of the frame, wherein in the closed position of the frame the mass of divisible food is apportioned into a plurality of portions including one portion within each of the pairs of communicating cavities.

5. The frame for dividing a mass of divisible food into portions according to claim 4, further comprising a latch having an L-shaped strip mounted at one end on the side of the first perimeter wall of the first part of the frame approximately opposite to the hinge, said strip extending outwardly from the first part of the frame to a bend, and perpendicularly to the first common plane from the bend, said strip having an outwardly protruding tooth disposed adjacent to the end thereof opposite the bend, said latch having a plate with an edge mounted on the side of the second perimeter wall of the second part of the frame approximately opposite to the hinge, said plate having an aperture therein adapted to slidably accommodate the strip, the strip being disposed within the opening in the plate with the tooth on the opposite side of the plate from the first part of the frame and engaging the plate, whereby the latch will retain the frame in closed position even though the frame is not completely closed.

6. The frame for dividing a mass of divisible food into portions according to claim 4, wherein the first perimeter wall of the frame is square in a plane parallel to the first common plane and the second perimeter wall of the frame is square in a plane parallel to the second common plane, the first part of said frame having two divider walls extending between opposite sides of the first part of the frame perpendicular to each other, said divider walls providing the first part of the frame with four square cavities, the second perimeter wall of the frame is square in a plane parallel to the second common plane, the second part of said frame having two divider walls extending between opposite sides of the second part of the frame perpendicular to each other, said divider walls providing the second part of the frame with four square cavities.

7. The frame for dividing a mass of divisible food into portions according to claim 4, the plurality of portions being frozen.

\* \* \* \* \*